United States Patent
Hansen et al.

(10) Patent No.: US 7,808,710 B2
(45) Date of Patent: Oct. 5, 2010

(54) MULTILAYER ELEMENT COMPRISING MICROLENSES

(75) Inventors: Achim Hansen, Zug (CH); Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 53 days.

(21) Appl. No.: 12/308,928

(22) PCT Filed: Jun. 23, 2007

(86) PCT No.: PCT/EP2007/005552
§ 371 (c)(1),
(2), (4) Date: Dec. 23, 2008

(87) PCT Pub. No.: WO2008/000402
PCT Pub. Date: Jan. 3, 2008

(65) Prior Publication Data
US 2009/0290221 A1 Nov. 26, 2009

(30) Foreign Application Priority Data
Jun. 26, 2006 (DE) .................. 10 2006 029 536

(51) Int. Cl.
*G02B 27/10* (2006.01)
(52) U.S. Cl. ...................... 359/619; 359/620
(58) Field of Classification Search ............. 359/619, 359/620
See application file for complete search history.

(56) References Cited

U.S. PATENT DOCUMENTS

| 5,712,731 | A | 1/1998 | Drinkwater et al. |
| 7,333,268 | B2 * | 2/2008 | Steenblik et al. ............ 359/619 |
| 2008/0160226 | A1 | 7/2008 | Kaule et al. |

FOREIGN PATENT DOCUMENTS

| DE | 102005028162 | 12/2006 |
| WO | WO 01/39138 | 5/2001 |
| WO | WO 2005/052650 | 6/2005 |
| WO | WO 2005/106601 | 11/2005 |

* cited by examiner

*Primary Examiner*—William C Choi
(74) *Attorney, Agent, or Firm*—Hoffmann & Baron, LLP (57) ABSTRACT

Described is a multilayer body for representing microimages provided with gray value gradations or color gradations. The multilayer body has a transparent first layer in which a plurality of microlenses are shaped, and a second layer (61) which is arranged beneath the first layer and has a plurality of microimages. The microlenses are arranged in accordance with a microlens raster. The second layer has a plurality of microimage regions (61b) arranged in accordance with a microimage region raster whose raster width is <300 μm. Within each microimage region two or more of the microimages (61ma through 61mc) arranged in a microimage raster respectively differ from each other, wherein the raster spacings of the microlens raster and the microimage raster differ from each other by less than 10%. The microimages have regions with a gray value or a color value. Also disclosed is a process for the production of the multilayer body.

32 Claims, 4 Drawing Sheets

MULTILAYER ELEMENT COMPRISING MICROLENSES

This application claims priority based on an International Application filed under the Patent Cooperation Treaty, PCT/EP2007/005552, filed on Jun. 23, 2007 and German Application No. DE 102006029536.6-45, filed on Jun. 26, 2006.

BACKGROUND OF THE INVENTION

The invention concerns a multilayer body having microlenses and a process for the production thereof.

Multilayer bodies having microlenses and identical repetitive microimages arranged under the microlenses are used as security elements for security documents such as for example bank notes and ID cards.

Thus for example U.S. Pat. No. 5,712,731 discloses such an arrangement of a microlens grid raster and a microimage grid raster formed by a plurality of identical microimages arranged in accordance with the microimage raster. The microlenses arranged in a microlens array produce a copy of the microimages, that is enlarged in pixel fashion, so that an enlarged representation of the microimage becomes visible to the viewer. As the pixel, which is respectively represented by the microimages, of the respective microimage changes in dependence on the vertical and horizontal viewing angles, such an arrangement of a microlens raster and a microimage raster with identical microimages exhibits an optically variable effect, that is to say the microimage which is enlarged for the viewer appears to move when the arrangement is turned and/or tilted. The image produced can be in front of or behind the plane of the substrate.

In the production of such arrangements it is necessary for microimages to be formed with a very high resolution in a layer of the multilayer body. In that respect the production of microimages with gray value or color gradations has proven to be particularly problematical so that this image-generation process is at the present time restricted to simple, monochrome motifs and themes such as alphanumeric characters and simplistic logos.

SUMMARY OF THE INVENTION

The object of the present invention is now to provide an improved multilayer body and a process for the production thereof.

That object is attained by a multilayer body comprising a transparent first layer in which a plurality of microlenses are shaped and a second layer which is arranged beneath the first layer and which has a plurality of microimages, wherein the microlenses are arranged in accordance with a microlens raster and the microimages are arranged in accordance with a microimage raster, wherein the second layer has a plurality of microimage regions, with each of which there are respectively associated two or more of the microimages and which are arranged in accordance with a microimage region raster, the raster width of which is <300 μm, and wherein within each one of the microimage regions respectively two or more of the microimages differ from each other, and the raster spacings of the microlens raster and the microimage raster in each of the microimage regions differ from each other by less than 10%.

That object is further attained by a process for the production of a multilayer body comprising an optical security feature, which includes the following steps:

splitting up a representation into M image regions, wherein M is greater than 1, determining the gray values or the color values of the M image regions, calculating a set of >=N different microimages, wherein N is greater than 1, each of the microimages comprises M image regions and each of the M image regions has a gray value or color value determined in dependence on the gray value or color value respectively of the respective image region of the representation, providing a multilayer body comprising a transparent first layer in which a plurality of microlenses are shaped, which are arranged in a microlens raster, and providing a second layer in the multilayer body, which has a plurality of microimage regions arranged in accordance with a microimage region raster, wherein each of the microimage regions has N microimages which are selected from the calculated set of microimages, the raster spacings of the microlens raster and the microimage raster in each of the microimage regions differ from each other by less than 10%, the microimage region raster has a raster width of less than 300 μm and two or more of the microimages respectively differ from each other within each microimage region.

The invention makes it possible on the one hand to provide a representation, exhibiting the above-described optically variable effect, of an image having a plurality of gray value gradations or color value gradations, without for that purpose having to provide in the second layer a plurality of high-resolution gray value images/multicolor images. That substantially simplifies the production of a security element generating that effect. In addition that makes it possible to simulate the above-described optical effect by an arrangement of a plurality of different microimages, thereby affording further advantages. Thus on the one hand troublesome moiré effects are suppressed so that the representation appears more brilliant while on the other hand the level of safeguard against forgery is substantially increased by virtue of the higher level of complexity. Each pixel is produced by superpositioning of the corresponding pixels of at least two different microimages. An enlarged pixel is generated from the pixels of the microimages, that pixel having a color value or gray value which is established independently of the other pixels. The raster widths of the first microimage raster and the microlens raster differ from each other by less than 10% in each of the microimage regions and the raster width of the microimage region raster is <300 μm so that the microimage region raster is not visible to the naked human eye under normal viewing conditions and the above-described effect is generated.

That provides an easily remembered and surprising security feature which cannot be imitated at all or only at a high degree of complication and expenditure.

In that respect it is also possible for the first layer in which a plurality of microlenses is shaped and the second layer having a plurality of microimage regions to be separable from each other and to be brought into coincident relationship only for providing a security feature. The first and second layers can thus be arranged in distinct bodies which are separated from each other, for example a first body which forms a security document and a second body which serves as a verifier. When the verifier is placed over the security document the above-described optical effect is generated. Furthermore the first layer and the second layer can be provided in different regions of a security document and can be brought into coincident relationship by means of folding of the security document. The first layer with the plurality of microlenses is thus for example arranged in a transparent window in the security document.

In accordance with a preferred configuration of the invention the raster width of the microimages and/or the microlenses in adjacent microimage regions is constant, but involves a slightly different phase displacement from one microimage region to another. That further improves the brilliance of the representation. In addition it is also possible for all microimage regions to have a unitary microlens raster and microimage raster, the raster width of which however differs slightly, for example differing from each other by not more than 10%.

Preferably in that respect the raster width of the microlens raster and the microimage raster differs in the parts per thousand range. Furthermore it is also possible for the microlens raster and the microimage raster to have approximately the same raster width and for the microimage raster and the microlens raster to be slightly rotated relative to each other, for example rotated relative to each other through 0.3°. In this case also an only slight rotation of the rasters relative to each other, in the range of up to 1°, is preferred. It is thereby possible for the thickness of the multilayer body to be reduced by virtue of the increase in the "enlargement factor".

In accordance with a further preferred embodiment of the invention the raster widths of the microimages and/or the microlenses in adjacent microimage regions differ. Thus for example the microlens raster has a constant raster width and the raster width of the microimage raster differs from one microimage region to another, thus for example it is 100%, 100.10%, 100.2%, . . . 100.9% of the raster width of the microlens raster. That makes it possible to achieve attractive dynamic color value and gray value alteration effects as well as depth effects.

In addition it is also possible in a first group of microimage regions to use microimages which differ from the microimages in a second group of microimage regions. Preferably the microimages used in the microimage regions change slightly for example in dependence on the selected co-ordinate system from one microimage region to another, whereby it is possible to achieve pattern configurations. Pattern configurations of that kind are further possible by virtue of the arrangement of a plurality of mutually juxtaposed group regions in the second layer, wherein each group region includes two or more microimage regions and the microimages used in the respective microimage regions respectively differ somewhat from one group region to another. In that case the size of a group region is preferably more than 1 mm$^2$. Furthermore, by virtue of the such a concept, it is possible to achieve a variation in the optical impression over the group regions, as well as to implement effects such as positive/negative images, light/dark combinations and the like.

The process according to the invention provides that a representation is split up into M image regions, the gray values or the color values of the M image regions are determined and the gray values or the color values are imaged onto a gray value scale or onto a color value space. In that respect it can advantageously be provided that the graphic representation is limited to a few striking gray values or color values. The process according to the invention however also permits fine gray value or color gradations so that there is a wide scope in terms of creative design.

Further advantageous configurations are recited in the appendant claims.

It can be provided that the microimages have regions with a gray value of zero and regions with a unitary gray value >zero, preferably with a gray value 1 from a standardized gray value scale embracing S gray values of between 0 and 1. The gray value of an image region in the representation which is enlarged or magnified by the microlenses arises out of the standardized sum of the gray values of the associated image regions of the microimages provided in a microimage region. If thus for example N microimages are provided in a microimage region, then N+1 different gray values can be generated thereby, wherein the gray value 1 can be achieved only if all associated image regions are of the gray value 1. If only one of the associated image regions has a gray value 1 and the other associated image regions have the gray value 0, then in total that gives a gray value S of 1/N.

It can further be provided that an effective gray value $1/(S-1)$ from a standardized linear gray value scale of between 0 and 1, that embraces S gray values, is associated with the regions of the microimages with a gray value >zero. If the situation involves for example a gray value scale embracing 9 gray values, in which the smallest gray value is typically identified by "white" and the highest gray value is typically identified by "black", then the gray value ⅛=0.125 is associated with the black regions of the microimages. Thus for example the gray value 0.5 can be represented by four-fold superpositioning and the gray value 1 by eight-fold superpositioning. Therefore at least 8 different microimages must be arranged in each microimage region, that is to say S−1 microimages, in order to be able to represent the full gray value scale. Each of those S−1 microimages has only two gray values, and thus for example comprises a black-and-white image.

As in addition for example the gray value 0.5 can be achieved by four-fold superpositioning of the gray values 1, that is to say that can already be achieved by $(S-1)/2$ microimages, then within an arrangement of 8 microimages, there are a number of possible ways of achieving that result. That makes it possible to provide in adjacent microimage regions a respective differentiating set of microimages so that adjacent microimage regions can respectively have a different set of different microimages.

It can further be provided that the microimages have colorless and/or white and/or transparent regions as well as colored regions with one color. The terms "colorless", "white" and "transparent" are here equivalent terms which mean that the regions identified in that way are not provided with the identified color. Because each microimage has only two color values, in principle this involves what is referred to as a black-and-white image.

It can advantageously be provided that the color regions have a primary color. The primary color is color which belongs to those colors from which all other colors can be mixed. For example magenta, yellow and cyan can be provided as primary colors. It will be noted however that it is also possible to provide any colors for mixing, for example for reasons relating to creative design or technological aspects. It can for example also be provided that UV colors and/or IR colors are used, which upon illumination with UV light and IR radiation respectively, emit light in the visible spectral range.

It can further be provided that the colored regions of the microimages have one of G colors with a color value or an associated effective color value $1/(F_G-1)$ of a linear standardized color value scale of between 0 and 1, embracing $F_G$ color values. It can advantageously be provided that similar color value scales are used, for example color value scales embracing five color values. The color value can involve the color saturation value which can be adjusted in the case of printing inks for example by the proportion of color pigments.

It can further be provided that the microimages are selected from a set of microimages. It can preferably be provided that the microimages are selected from a set of M*S and $M*G*F_G$ microimages respectively. That set can be enlarged at any time however by for example increasing the number M of image regions, by dividing up one or more image regions. The greater the number of microimages available, the correspondingly more microimage regions of different configurations can be formed, whereby for example imitation of the multilayer body is made still more difficult and brilliance of the representation can be further increased.

It can be provided that the microimages within each of the microimage regions are randomly selected and/or randomly arranged. In that respect it can further be provided that, in relation to more than one selection option, the randomness decides. Random selection makes it possible for example to prevent the occurrence of troublesome moiré effects. In addition in that way it is possible to enhance the forgery-proof nature because the random selection cannot be replaced by deterministic mathematical methods.

It can also be provided that the selection and/or distribution of the microimages follows a concealed principle and in that way concealed information is encoded in the arrangement and/or distribution of the microimages.

It can further be provided that the selection of the microimages is so selected that, in relation to a viewer, in the superpositioning of the optical action of the microimages arranged in a microimage region, a stepped image impression is produced, wherein the superposed microimages have gray values from the gray value scale embracing S gray values or color values from a color space embracing $G*F_G$ color values. Because the microimages and microlenses are structures involving dimensions below the resolution capability of the human eye, the image impression is harmonic without hard color gradations or pixelated regions.

In regard to the above-described linear gray value scales or color value scales it is to be noted that deviations from linearity do not cast doubt on the principle of grading gray values or color saturation values by superpositioning. Linear scales however are better suited to calculation than non-linear scales.

It can further be provided that the pixels of the microimages are occupied by different optically variable elements, in particular different diffraction structures, different thin film layer elements or different liquid crystal layers. Those optically variable elements can be associated with a color value or gray value (for example gray value 1 or one of the primary colors) and—as discussed above—can occupy the image region or the background region of the different microimages. In addition it is also possible for different optically variable elements to be respectively associated with a primary color and that therefore provides the viewer with a representation which, besides color effects, presents further optical effects.

In addition it is also possible for color values or gray values to be associated with UV colors or IR colors. In that way it is for example possible to implement true-color UV images by for example corresponding UV colors being associated with the primary colors and provided in the second layer—as described above.

A further advantageous configuration provides that the pixels of the microimage have different polarization properties. Such a multilayer body can contain concealed security features which are not accessible to a viewer and which are disclosed for example only with an arrangement of polarization filters or under polarized light.

It can be provided that the microimages have pixels arranged in a pixel grid raster. In that fashion it is particularly simple to analyze an image or graphic representation and then generate the microimages.

In regard to the design configuration of the microlenses it can be provided that the microlenses are of a diameter of between 10 and 150 µm.

A further advantageous configuration provides that the microlenses are of a diameter of less than 50 µm.

It will be noted however that the arrangement may also involve microlenses of a different geometrical shape, for example cylindrical lenses, in which case the microlenses can be of a width of between 10 and 150 µm at least in one direction of extension, for example a width of less than 50 µm.

As regards the raster width, it can be provided that the raster width of the microlenses and/or the microimages is constant. It can however also be provided that the raster width of the microlenses and the microimages is variable.

It can further be provided that the rasters of the microlenses and the microimages are displaced relative to each other. That can arouse the impression for the viewer that the representation which is visible when the multilayer body according to the invention is tilted is arranged laterally behind a window for, with an inclined viewing direction, he sees regions in the representation which are not visible with a more perpendicular viewing direction.

It can be provided that the first layer and the second layer together are of a thickness of between 10 µm and 1,000 µm. An advantageous configuration provides that the first layer and the second layer are together of a thickness of between 15 µm and 50 µm.

Because of the higher degree of flexibility, a small thickness can be advantageous for use of the multilayer body according to the invention as a security element on paper substrates or film substrates. On the other hand the thickness of the two layers and in particular the thickness of the first layer must be adapted inter alia to the focal length of the microlenses. In that respect a compromise possibly has to be made between the dimensions of the microlenses and the thickness of the layers.

It can be provided that the microlenses are in the form of refractive lenses. It is advantageous with that configuration that microlenses in the form of portions of a sphere can be produced for example by means of intaglio printing, in which case the shape of the microlenses is produced of its own accord, with a suitable viscosity for the material of the microlenses, under the effect of surface tension. It is further possible to provide a UV-hardening lacquer for producing the microlenses.

The UV-hardening lacquer forms a replication lacquer layer in which a surface structure corresponding to the microlens raster is shaped by means of a suitably shaped tool, and is then fixed by UV hardening of the lacquer.

It can further be provided that the microlenses are in the form of diffractive lenses. A further advantageous configuration provides that the microlenses are covered with a layer, wherein the refractive index difference between the layer and the layer in which the microlenses are shaped is greater than 0.2. The said layer can be provided on the one hand as a protective layer to protect the microlenses from soiling and/or scratching. The protective layer can be provided on the other hand so that the microlenses cannot be made out by touch, under any circumstances.

It can further be provided that the layer is an adhesive layer.

It can be provided that the second layer is a metallic layer. By way of example the surface profile can be formed in the metallic layer in such a way that reflection or transmission of the metallic layer is graduated in accordance with a gray value scale.

It can further be provided that the second layer has a high-refraction dielectric layer. Total reflection can be produced by means of the high-refraction dielectric layer for example in conjunction with a low-refraction layer at the interface between the two layers, whereby particularly brilliant images can be produced. A high degree of long-term stability is also to be noted in relation to the high-refraction dielectric layer whereas the reflection capability of metallic layers can decrease due to oxidization as a consequence of atmospheric oxygen. Gas diffusion through in particular thin plastic layers is a known phenomenon.

It can also be provided that the second layer has a colored pigment layer. The color pigments make it possible to set predetermined color values in a particularly simple and targeted fashion.

A further advantageous configuration provides that the second layer is formed by a thin film layer system. It can also be provided that the second layer is formed only region-wise by a thin film layer system.

It can be provided that the second layer has a colored photoresist layer. It can also be provided that the second layer has a photoresist layer only region-wise.

It can further be provided that the second layer has a colored lacquer layer. It can also be provided that the second layer has a colored lacquer layer only region-wise.

BRIEF DESCRIPTION OF THE DRAWINGS

The invention is described more fully by way of example hereinafter by means of a number of embodiments with reference to the accompanying drawings in which.

DETAILED DESCRIPTION OF THE INVENTION

Figure 1:
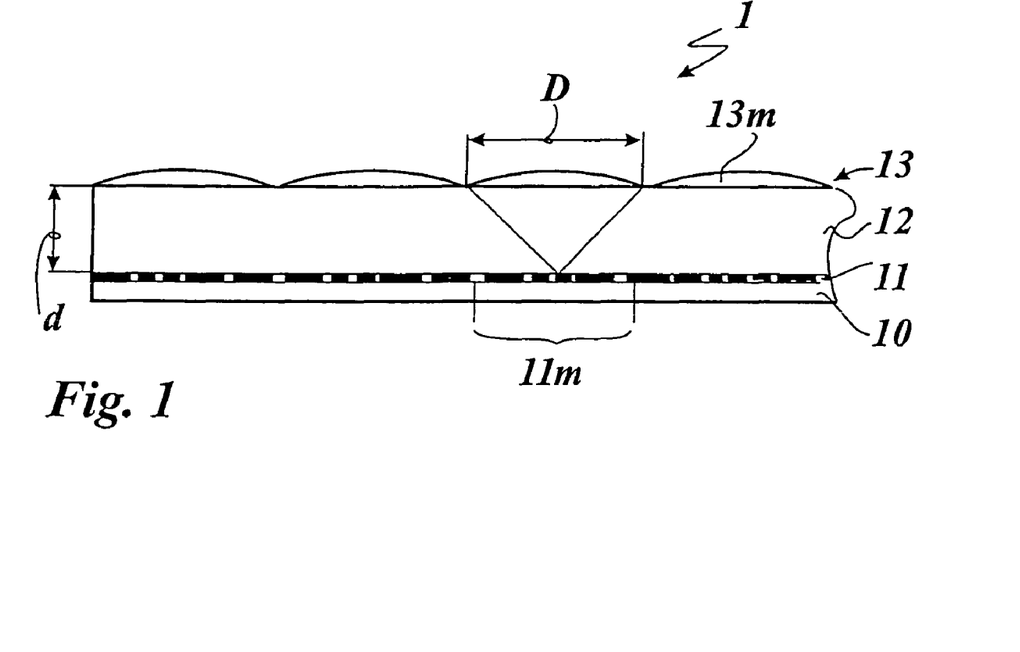
FIG. 1 shows a diagrammatic view in section of a multilayer body according to the invention.

FIG. 1 shows a multilayer body 1 having a carrier layer 10, a microimage layer 11, a spacer layer 12 and a microlens layer 13. The spacer layer 12 is of a thickness d corresponding to the focal length of a microlens 13m of the microlens layer 13. Preferably the microlens layer 13 and the spacer layer 12 are formed from the same material or they are at least of the same refractive index. The microlens layer 13 can be applied to the spacer layer 12, for example by means of intaglio printing. The microlens layer 13 can however also be shaped in the spacer layer 12, for example by hot embossing. The microlenses 13m are of a diameter D which can be between 10 μm and 150 μm.

Figure 2:
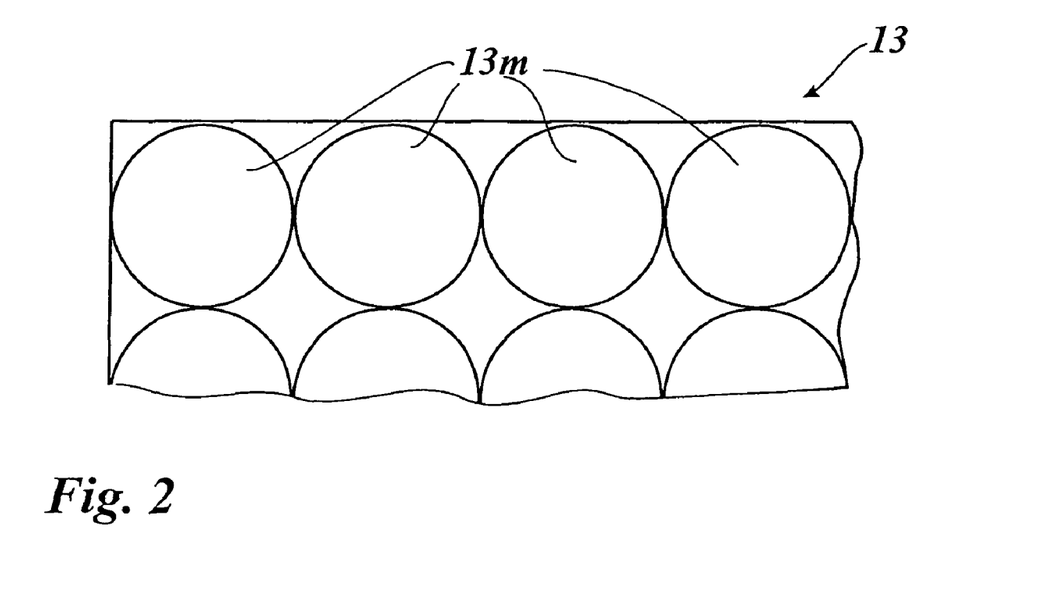
FIG. 2 shows a diagrammatic plan view of the multilayer body of FIG. 1.

As can be seen from the plan view in FIG. 2 the microlens layer 13 comprises microlenses 13m arranged in a square microlens grid raster. The microlenses in the illustrated embodiment involve spherical refractive lenses which are particularly simple to manufacture. It is however also possible to provide other refractive lenses or also diffractive lenses.

The microimage layer 11 has repetitive microimages 11m arranged in a square microimage grid raster, the raster widths of the microimage raster and microlens raster differing by a maximum of 10%. The two different raster widths provide that the microlenses 13m respectively form the image of another pixel of the microimages 11m. That provides for an enlarged pixel-wise imaging effect in respect of the microimages 11m. The same effect is also possible if the two rasters are slightly pivoted relative to each other. It is also possible to provide other kinds of raster, for example with rectangular or honeycomb raster elements, or raster elements which are oriented in relation to a geometrically transformed co-ordinate system (for example in a wave shape), if the microimage raster and the microlens raster are designed on the basis of the same principle. Because of the possible options described hereinbefore in respect of different lens kinds and/or lens shapes it is possible to provide suitable lenses for the aforementioned other kinds of rasters.

Figure 3:
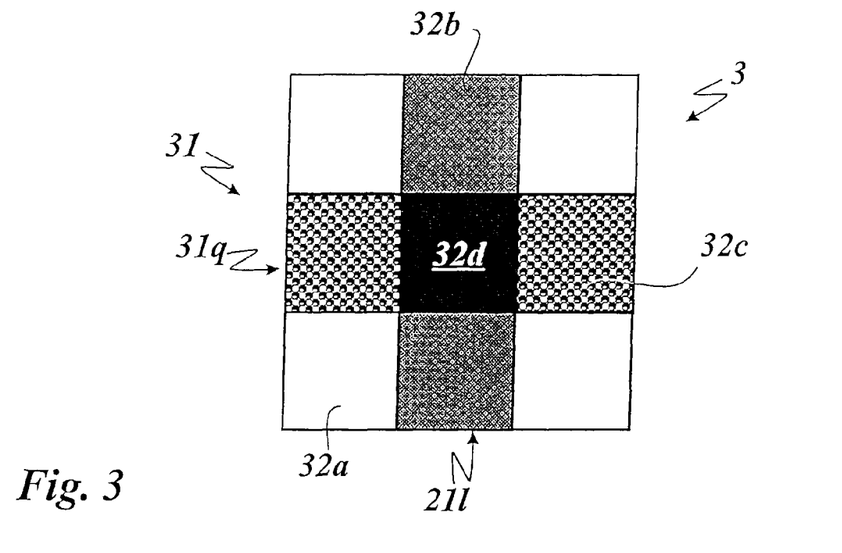
FIG. 3 shows a diagrammatic view of a graphic representation for producing a microimage.

FIG. 3 now shows a graphic representation 3 which can preferably involve a logo and/or alphanumeric characters. The graphic representation 3 is a gray value image with a square external boundary with the representation of a cross 31 which has identical arms and which terminates with the outer boundary. The cross 31 is arranged against a light background having a first gray value 32a. The two arms of the cross 31, which are crossed at a right angle, involve different gray values 32b and 32c and the intersection region of the two arms involves a fourth gray value 32d.

Figure 4:
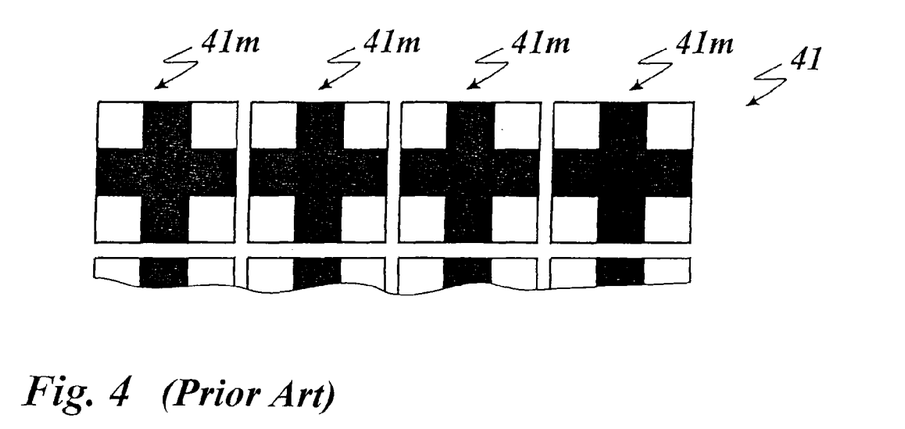
FIG. 4 shows a diagrammatic view of a repetitive arrangement of microimages as shown in FIG. 2 in accordance with the state of the art.

FIG. 4 now shows a microimage layer 41, formed with repetitive square microimages 41m which are produced in accordance with the state of the art from the graphic representation 3. The identical microimages 41m are in the form of black-and-white images, that is to say they cannot reproduce the gray values of the graphic representation 3. The microimages 41m are arranged in a square microimage raster. The microimages 41m can be rendered visible with the microlens array of microlenses 13m (see FIGS. 1 and 2), that is shaped in the microlens layer 13. When viewing onto the microlens layer 13, a viewer sees a microimage 41m which is enlarged pixel-wise and which is formed by each of the microlenses 13m enlarging a pixel of the microimage 41m associated therewith.

Figure 5:
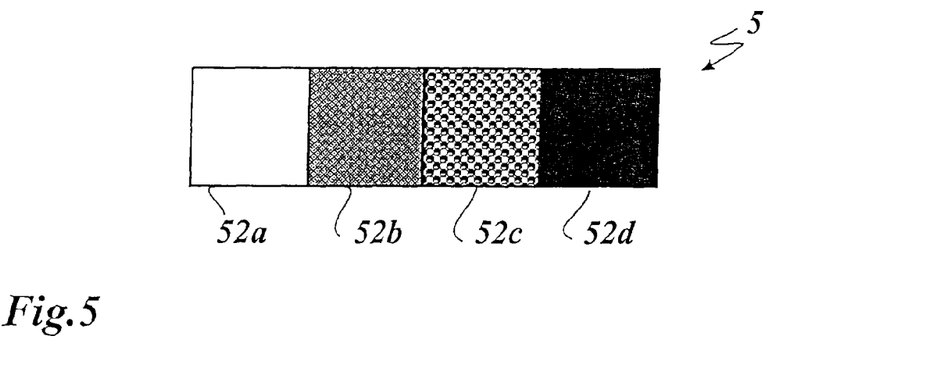
FIG. 5 shows a gray value scale of the graphic representation in FIG. 2.

FIG. 5 now shows a gray value scale 5 which embraces the four gray values 50a through 50d ascertained in the graphic representation 3 in FIG. 3. The gray values are arranged with an increasing gray value from left to right. In a gray value scale typically the smallest gray value is denoted by "white" and the largest gray value by "black". If the measurement number 0 is attributed to the gray value "white" and the measurement number 1 to the gray value "black", then a standardized linear gray value scale embraces the following gray values:

0-⅓-⅔-1.

The gray value scale 5 involves such a linear gray value scale.

If the starting and end values of the gray value scale involve freely selectable gray values, between which the further gray values of the scale are arranged in linear gradation, it can also be provided that the starting value is denoted by "black" and the end value by "white". Such a positive-negative effect can be observed for example if the surface of the microimage layer, that is towards the microlens layer, is occupied by a reflection layer which in transmitted light appears more or less transparent or if the microimage layer is a reflection layer having that property.

Figure 6:
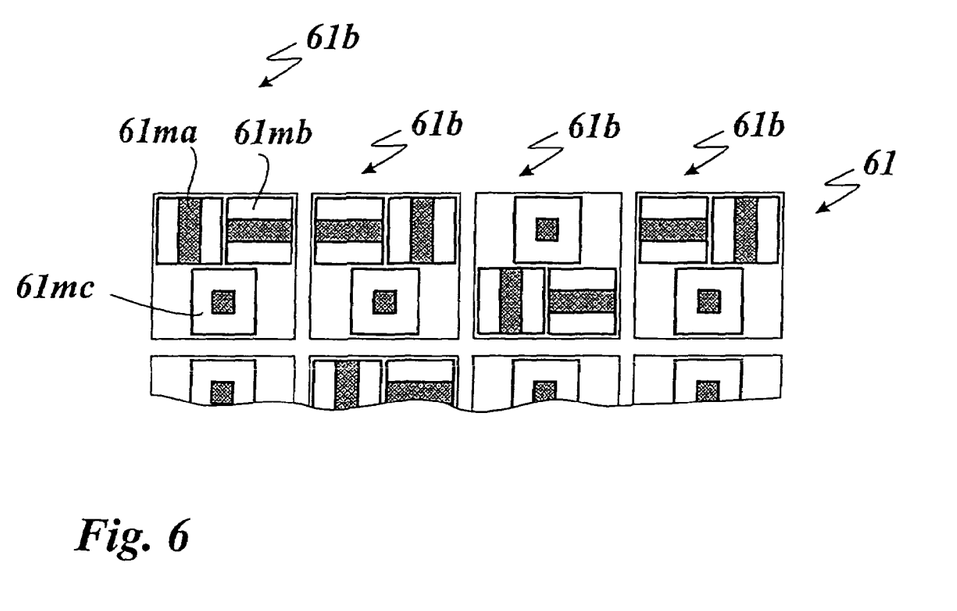
FIG. 6 shows a diagrammatic view of a first embodiment of a repetitive arrangement of microimages as shown in FIG. 2.

FIG. 6 now shows a first embodiment of the multilayer body according to the invention, in which a microimage layer 61 repetitively has microimage regions 61*b* which are arranged in a square grid raster and which contain microimages 61*ma*, 61*mb* and 61*mc*. In that case, a microlens of the microlens layer is associated with each of the microimages of the microimage regions 61*b*, wherein the raster width of the microlens raster and the microimage raster in each of the microimage regions differ from each other by less than 10%. The edge length of the microimage regions 61*b* is less than 300 μm so that the microimage regions 61*b* cannot be resolved by a naked human eye.

A perpendicular bar or arm is shown on the microimage 61*ma*, a horizontal bar or arm is shown on the microimage 61*mb* and the square intersection region of the two bars or arms is shown on the microimage 61*mc*. When considered together the three microimages 61*ma*, 61*mb* and 61*mc* form a resulting microimage reproducing the four gray values 50*a* through 50*d* of the gray value scale 5 (see FIG. 5). In that respect the microimages 61*ma* through 61*mc* are in the form of black-and-white images with the two gray values 0 and $1/(S-1)$, wherein S denotes the number of gray values in the scale 5. The microimages 61*ma* through 61*mc* therefore have the gray values 0 and $1/(4-1)=\frac{1}{3}$ and the number of the various microimages is equal to the number of the gray values different from zero, that is to say in this embodiment three different microimages are required.

Table 1 below shows the provision of the different gray values by superpositioning of the gray values of the microimages 61*ma* through 61*mc*.

TABLE 1

| Gray value | Standardized gray value | Superposed gray value |
| --- | --- | --- |
| 50a | 0 | 0 (50a) |
| 50b | ⅓ | ⅓ (50b) |
| 50c | ⅔ | ⅓ + ⅓ (2 × 50b) |
| 50d | 1 | ⅓ + ⅓ + ⅓ (3 × 50b) |

The microimages 61*ma*, 61*mb* and 61*mc* are arranged randomly in the microimage regions 61*b* in the FIG. 6 embodiment. It is however also possible to dispense with the random arrangement, which however advantageously still further enhances the level of safeguard against forgery of the multilayer body according to the invention and avoids troublesome moiré effects.

The microlenses (see FIGS. 1 and 2) associated with microimages 61*ma*, 61*mb* and 61*mc* are arranged similarly to the microimages, that is to say in the FIG. 6 embodiment they are arranged in the form of triplets, the diameter D of which corresponds to the edge length of a microimage.

Figure 7:
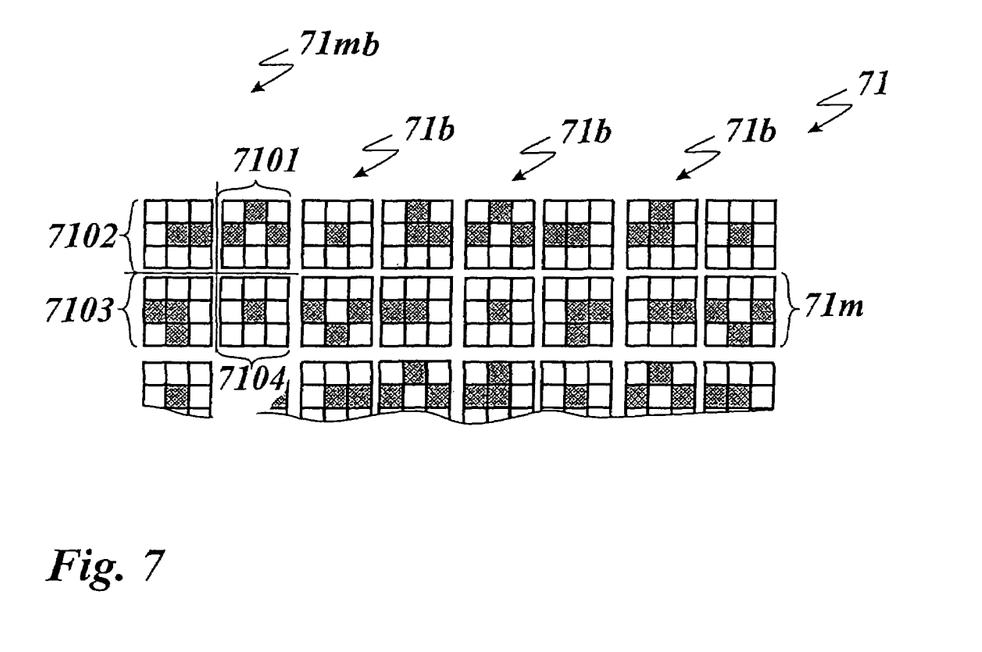
FIG. 7 shows a diagrammatic view of a second embodiment of a repetitive arrangement of microimages as shown in FIG. 2.

FIG. 7 now shows a second embodiment in which a microimage layer 71 has various microimage regions 71*b* which each have four microimages respectively of different microimages 7101 through 71*m*, wherein m is a selection of the n possible microimages (m<n). Such an arrangement can be advantageous in regard to the uniform distribution of the microlenses because the microlenses are now arranged in a square raster as in the FIG. 4 embodiment in accordance with the state of the art and are not once again arranged in a square raster affording triplets as in the embodiment described hereinbefore with reference to FIG. 6.

To calculate the microimages 7101 through 71*m* a 3×3-raster is placed over the graphic representation 3 (FIG. 3) in this embodiment and the gray value of each raster element is determined. The microimages 7101 through 71*m* also have a 3×3-raster, wherein the gray value of a raster element can assume the values 0 or ⅓, as described in detail hereinbefore with reference to FIG. 6. Table 2 hereinafter shows the procedure involved.

TABLE 2

| Gray value | Standardized gray value | Superposed gray value |
| --- | --- | --- |
| 50a | 0 | 4 × 0 (4 × 50a) |
| 50b | ⅓ | 3 × 0 + 1 × 1 (3 × 50a + 1 × 50b) |
| 50c | ⅔ | 2 × 0 + 2 × 1 (2 × 50a + 2 × 50b) |
| 50d | 1 | 1 × 0 + 3 × 1 (1 × 50a + 3 × 50b) |

Because more microimages are provided in this embodiment than there are gray values >0, the excessive raster elements have to be formed with the lowest gray value.

The arrangement of the microimages 7102 through 71*m*, provided in the embodiment shown in FIG. 7, is advantageous because in that case the raster elements of the microimages can be arranged in a common raster which is a sub-raster of the raster of the microimage regions. That can simplify production of the multilayer body. In addition it is possible here not only to arrange the microimages differently in adjacent image regions, but also to use a respectively different set of different microimages.

In place of the gray values it is also possible to provide different (primary) colors which can be graduated in color saturation values. Formed in that way is a multi-dimensional color space which with two different colors forms for example a color surface.

Figure 8:
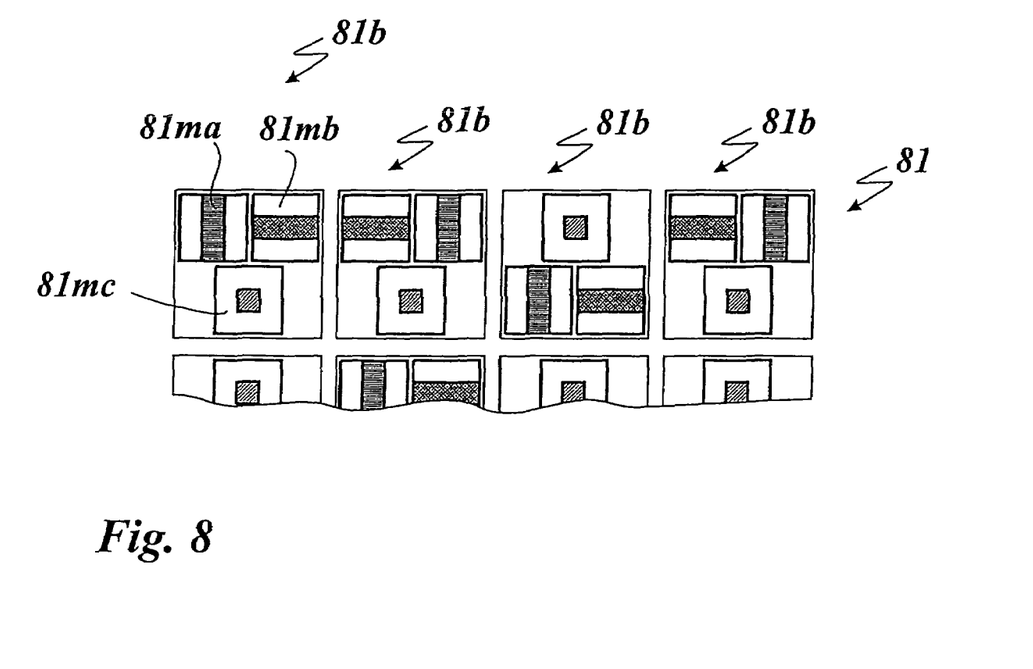
FIG. 8 shows a diagrammatic view of a third embodiment of a repetitive arrangement of microimages as shown in FIG. 2.

FIG. 8 now shows a third embodiment of the multilayer body according to the invention, in which a microimage layer 81 repetitively has microimage regions 81*b* which are arranged in a square raster and which include microimages 81*ma*, 81*mb* and 81*mc*. The edge length of the microimage regions 81*b* is less than 300 μm so that the microimage regions 81*b* cannot be resolved by a naked human eye.

A perpendicular beam or arm which is magenta in color is shown on the microimage 81*ma*, a horizontal beam or arm of the color cyan is shown on the microimage 81*mb* and the square intersection region of the two beams or arms, of the color yellow, is shown on the microimage 81*mc*. When viewed in combination the three microimages 61*ma*, 61*mb* and 61*mc* form a resulting microimage which has colorless regions as well as regions involving the colors magenta, cyan and black. In that case the microimages 81*ma* through 81*mc* are in the form of colored black-and-white images of the colors magenta, cyan and yellow. The graphic representation which forms the basis for the microimages 81*ma* through 81*mc* is a colored representation with the contours of the gray-scale representation in FIG. 3. In that respect the gray-scale values 50*a* through 50*d* correspond to the following color values:

50*a*: colorless (white or transparent)

50*b*: magenta

50*c*: cyan

50*d*: black

The colors of the graphic representation can be produced by the three primary colors magenta, yellow and cyan by color mixing.

Table 3 hereinafter shows the formation of the different colors by superpositioning of the color values of the microimages 81ma through 81mc.

TABLE 3

| Gray value | Color value | Superposed color value |
|---|---|---|
| 50a | colorless, white | colorless, white (white) |
| 50b | magenta | magenta (magenta) |
| 50c | cyan | cyan (cyan) |
| 50d | black | magenta + cyan + yellow (black) |

Besides the mixed color black the further colors red, green and blue can be represented by mixing two respective primary colors.

In the FIG. 8 embodiment the microimages 81ma, 81mb and 81mc are arranged randomly in the microimage regions 81b. It is however also possible to dispense with the random arrangement which however advantageously still further increases the level of safeguard against forgery of the multilayer body according to the invention and avoids possible moiré effects.

In addition it can be provided that the (primary) colors are graduated in their color saturation, in which respect linear color value scales are provided by analogy with the gray value scale (see FIG. 5) so that, starting from a very low level of color saturation different from zero, further levels of color saturation can be produced by superpositioning of the lowest level of color saturation.

The invention claimed is:

1. A multilayer body comprising a transparent first layer in which a plurality of microlenses are shaped and a second layer which is arranged beneath the first layer and which has a plurality of microimages, wherein the microlenses are arranged in accordance with a microlens raster and the microimages are arranged in accordance with a microimage raster, wherein
   the second layer has a plurality of microimage regions, with each of which there are respectively associated two or more of the microimages and which are arranged in accordance with a microimage region raster, the raster width of which is <300 µm, wherein within each one of the microimage regions respectively two or more of the microimages differ from each other, the microimages have first regions with a color value of zero and second regions with one of G different colors and a respective unitary color value >zero, with respect to a standardized color value scale of between 0 and 1 embracing $F_G$ color values, two or more of the microimages of each microimage region differ in their color and the microimages are so selected from a set of microimages that upon superpositioning of the optical action of the microimages arranged in a microimage region the result is a graduated image impression with color values from a color space embracing $G^* F_G$ color values, and the raster spacings of the microlens raster and the microimage raster in each microimage region differ from each other by less than 10%.

2. A multilayer body as set forth in claim 1, wherein different microimages are arranged in each of the microimage regions N and the spatial arrangement of the N different microimages within the microimage region of two adjacent microimage regions differs.

3. A multilayer body as set forth in claim 1, wherein the first regions of the microimages are colorless, white or transparent regions.

4. A multilayer body as set forth in claim 1, wherein at least $G^*F_G$ different microimages respectively are provided in each microimage region.

5. A multilayer body as set forth in claim 1, wherein different sets of different microimages are provided in two adjacent microimage regions, wherein the different sets are so selected that additive superpositioning of the optical action of the respective sets affords the same multi-color image respectively.

6. A multilayer body as set forth in claim 1, wherein the microimages are randomly selected and/or distributed.

7. A multilayer body as set forth in claim 1, wherein regions of the microimages are occupied with different optically variable elements.

8. A multilayer body as set forth in claim 1, wherein regions of the microimages have different polarization properties.

9. A multilayer body as set forth in claim 1, wherein the microimages have pixels arranged in a pixel raster.

10. A multilayer body as set forth in claim 1, wherein the graphic representation of the microimages within a microimage raster differs.

11. A multilayer body as set forth in claim 1, wherein the microlenses are of a diameter of between 10 and 150 µm.

12. A multilayer body as set forth in claim 1, wherein the microlenses are of a diameter of less than 50 µm.

13. A multilayer body as set forth in claim 1, wherein the raster width of the microlens raster and/or the microimage raster is constant.

14. A multilayer body as set forth in claim 1, wherein the raster width of the microlens raster and/or the microimage raster is variable.

15. A multilayer body as set forth in claim 1, wherein the microlens raster and the microimage raster are mutually displaced.

16. A multilayer body as set forth in claim 1, wherein the first layer and the second layer are together of a thickness of between 10 µm and 1,000 µm.

17. A multilayer body as set forth in claim 1, wherein the first layer and the second layer are together of a thickness of between 15 µm and 50 µm.

18. A multilayer body as set forth in claim 1, wherein the microlenses are in the form of refractive lenses.

19. A multilayer body as set forth in claim 1, wherein the microlenses are in the form of diffractive lenses.

20. A multilayer body as set forth in claim 1, wherein the microlenses are covered with a layer, wherein the refractive index difference between the layer and the layer in which the microlenses are shaped is greater than 0.2.

21. A multilayer body as set forth in claim 20, wherein the layer is a protective layer.

22. A multilayer body as set forth in claim 20, wherein the layer is an adhesive layer.

23. A multilayer body as set forth in claim 1, wherein the second layer is a metallic layer.

24. A multilayer body as set forth in claim 1, wherein the second layer is a high-refraction dielectric layer.

25. A multilayer body as set forth in claim 1, wherein the second layer is a colored pigment layer.

26. A multilayer body as set forth in claim 1, wherein the second layer is formed by a thin film layer system.

27. A multilayer body as set forth in claim 1, wherein the second layer has a colored photoresist layer.

28. A multilayer body as set forth in claim 1, wherein the second layer has a colored lacquer layer.

29. A multilayer body as set forth in claim 1, wherein the first layer is part of a microlens analyzer and the second layer is part of a security document and the first and second layers are arranged separably from each other.

30. A process for the production of a multilayer body comprising an optical security feature, wherein the process includes the following steps:
   splitting up a representation into M image regions, wherein M is greater than 1;
   determining the color values of the M image regions;
   calculating a set of >=N different microimages, wherein N is greater than 1, each of the microimages comprises M image regions and each of the M image regions has a color value determined in dependence on the color value respectively of the respective image region of the representation;
   providing a multilayer body comprising a transparent first layer in which a plurality of microlenses are shaped, which are arranged in a microlens raster; and
   providing a second layer in the multilayer body, which has a plurality of microimage regions arranged in accordance with a microimage region raster, wherein each of the microimage regions has N microimages which are so selected from the calculated set of microimages that the microimages have first regions with a color value of zero and second regions with one of G different colors and a respective unitary color value >zero, with respect to a standardized color value scale of between 0 and 1 embracing $F_G$ color values, two or more of the microimages of each microimage region differ in their color and upon superpositioning of the optical action of the microimages arranged in a microimage region the result is a graduated image impression with color values from a color space embracing $G*F_G$ color values, the raster spacings of the microlens raster and the microimage raster in each of the microimage regions differ from each other by less than 10%, the microimage region raster has a raster width of less than 300 µm and two or more of the microimages respectively differ from each other within each microimage region.

31. A process as set forth in claim 30, wherein the color values are imaged onto a color value space which is defined by G primary colors which have a color saturation value from a color saturation scale embracing $F_G$ color values, and a set of at least $F_G*G$ different microimages is calculated, wherein each of the microimages comprises M image regions and each of the M image regions has either the color saturation value zero or the color saturation value 1 in accordance with a standardized color value scale of between 0 and 1.

32. A process as set forth in claim 30, wherein a set of S different microimages is calculated, which contains more than N different microimages and that different sets of N microimages are selected for at least two microimage regions from the set of S different microimages and are provided in the microimage regions.

* * * * *

UNITED STATES PATENT AND TRADEMARK OFFICE
CERTIFICATE OF CORRECTION

| | | |
|---|---|---|
| PATENT NO. | : 7,808,710 B2 | Page 1 of 1 |
| APPLICATION NO. | : 12/308928 | |
| DATED | : October 5, 2010 | |
| INVENTOR(S) | : Hansen et al. | |

It is certified that error appears in the above-identified patent and that said Letters Patent is hereby corrected as shown below:

IN THE CLAIMS:

Column 11, line 63,
Claim 2                                 now reads "regions N and the spatial arrangement of the N different"

should read --regions and the spatial arrangement of the different--

Signed and Sealed this
Twenty-first Day of June, 2011

David J. Kappos
*Director of the United States Patent and Trademark Office*